(12) United States Patent
Zhang et al.

(10) Patent No.: US 6,353,497 B1
(45) Date of Patent: Mar. 5, 2002

(54) INTEGRATED MODULAR OPTICAL AMPLIFIER

(75) Inventors: Kevin J. Zhang; Michael A. Scobey, both of Santa Rosa; Yiqiang Li, Milpitas, all of CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/518,708

(22) Filed: Mar. 3, 2000

(51) Int. Cl.$^7$ ............................................. H01S 03/00
(52) U.S. Cl. .................... 359/341.1; 359/349
(58) Field of Search ................. 359/342, 349, 359/127, 341.1; 385/47

(56) References Cited

U.S. PATENT DOCUMENTS

| | | | |
|---|---|---|---|
| 4,859,016 A | 8/1989 | Shaw et al. | 350/96.15 |
| 4,910,737 A | 3/1990 | Payne et al. | 372/6 |
| 4,923,279 A | 5/1990 | Ainslie et al. | 350/96.3 |
| 4,955,025 A | 9/1990 | Mears et al. | 372/6 |
| 5,005,175 A | 4/1991 | Desurvire et al. | 372/6 |
| 5,027,079 A | 6/1991 | Desurvire et al. | 330/4.3 |
| 5,082,343 A | 1/1992 | Coult et al. | 385/34 |
| 5,111,334 A | 5/1992 | Heidemann | 359/341 |
| 5,195,149 A | 3/1993 | Pfeiffer et al. | 385/28 |
| 5,210,808 A | 5/1993 | Grasso et al. | 385/27 |
| 5,260,816 A | 11/1993 | Edqgawa et al. | 359/341 |
| 5,260,823 A | 11/1993 | Payne et al. | 359/341 |
| 5,375,010 A | 12/1994 | Zervas et al. | 359/341 |
| 5,452,116 A * | 9/1995 | Kirkby et al. | 359/124 |
| 5,506,723 A | 4/1996 | Juniger | 359/341 |
| 5,594,821 A | 1/1997 | Cheng | 385/24 |
| 5,608,571 A | 3/1997 | Epworth et al. | 359/341 |
| 5,676,432 A | 10/1997 | Kosaka | 359/341 |
| RE35,697 E | 12/1997 | Grasso et al. | 385/24 |
| 5,710,660 A | 1/1998 | Yamamoto et al. | 359/341 |
| 5,726,796 A * | 3/1998 | Regener et al. | 359/341 |
| 5,801,858 A | 9/1998 | Roberts et al. | 359/114 |
| 5,831,754 A | 11/1998 | Nakano | 359/161 |
| 5,835,259 A | 11/1998 | Kakui et al. | 359/341 |
| 5,864,424 A | 1/1999 | Nakano | 359/341 |
| 5,900,969 A | 5/1999 | Srivastava et al. | 359/341 |
| 5,900,970 A | 5/1999 | Kakui | 359/341 |
| 5,914,808 A | 6/1999 | Mitsuda et al. | 359/341 |

FOREIGN PATENT DOCUMENTS

| | | | |
|---|---|---|---|
| WO | WO98/36294 | 8/1998 | |
| WO | WO99/13607 | 3/1999 | H04J/14/02 |
| WO | WO99/21039 | 4/1999 | G02B/6/293 |
| WO | WO99/22259 | 5/1999 | G02B/6/28 |
| WO | WO99/34538 | 7/1999 | H04B/10/00 |
| WO | WO99/41858 | 8/1999 | H04B/10/135 |
| WO | WO99/43118 | 8/1999 | H04J/14/02 |
| WO | WO99/49601 | 9/1999 | H04B/10/17 |
| WO | WO99/50938 | 10/1999 | H01S/3/00 |
| WO | WO99/52232 | 10/1999 | H04B/10/24 |
| WO | WO99/59281 | 11/1999 | H04J/14/02 |
| WO | WO99/65174 | 12/1999 | H04J/14/02 |
| WO | WO99/66660 | 12/1999 | H04B/10/18 |
| WO | WO00/01098 | 1/2000 | H04B/10/18 |

OTHER PUBLICATIONS

Becker et al., Erbium–Doped Fiber Amplifiers, p. 66, 273–74, 276, 294–95, 1999, San Diego.

* cited by examiner

*Primary Examiner*—Mark Hellner (57) ABSTRACT

An optical amplifier assembly integrating wavelength selective input and output filters. Integration of wavelength selective filters with a doped fiber optical amplifier stage provides a modular amplifier for use in wavelength division multiplexed optical communication systems. In one embodiment, a center tap provides access to the selected light signal after a first amplifier stage, allowing signal modification before returning the light signal to a second amplifier stage of the integrated amplifier. In a further embodiment, a pump interconnect is provided between the first and second amplifier stages to allow operation of both amplifier stages from a single pump light source.

7 Claims, 4 Drawing Sheets

INTEGRATED MODULAR OPTICAL AMPLIFIER

CROSS-REFERENCE TO RELATED APPLICATIONS

This application is being concurrently filed with co-assigned U.S. Application Ser. No. 09/517,648 entitled EXPANDABLE OPTICAL ARRAY by Kevin Zhang, Michael Scobey, and Robert Hallock, the disclosure of which is hereby incorporated for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention is generally related to optical amplifiers, and in particular provides an amplifier integrated with filters for use in wavelength division multiplexed optical communication networks.

BACKGROUND OF THE INVENTION

Optical fiber networks are used in a variety of applications, such as optical tele-communication and data transmission systems. Optical fiber networks use optical fibers as transmission lines for carrying light signals. The light signals propagate down the fiber from one location to another, analogous to electrical signals traveling down a wire or cable from one location to another. Optical fibers are used in a variety of applications, such as local loops and "long haul" transmission lines. Long haul transmission lines might carry signals between cities or across oceans, for example.

Optical fibers can carry a single channel, or many channels can be multiplexed onto a single fiber. Multiplexing is desirable because it allows more information to be carried on a single fiber. In wavelength division multiplexing ("WDM"), a number of channels are carried on a single optical fiber. A channel is typically defined as a frequency (wavelength) of light that can be modulated to carry information. Networks are typically designed to allocate a portion of the spectrum about a center frequency for signal transmission. For example, a channel might be allocated ±12.5 GHz on either side of the channel center frequency in a particular system, thus providing the channel with a "width" of 25 GHz., even though the channels are spaced 100 GHz apart. Other systems may require or allow a narrower or wider channel widths or spacings.

With increased use of the Internet and other communication technologies, the demand for increased transmission capacity continues to grow. Dense wavelength division multiplexing ("DWDM") technology has emerged as an efficient and economical approach to utilize optical fiber capacity For example, a single-mode fiber has about 300 nm of available bandwidth. In many systems, only a portion of that bandwidth is occupied (used).

Different telecommunication companies utilize the bandwidth available on an optic fiber transmission line in different fashions, for example by combining time division multiplexing ("TDM") with DWDM techniques. Some optical telecommunication equipment providers are planning on DWDM systems with up to 160 channels, while others are planning up to 80 channels, within various nominal frequency bands, such as the "10 GHz band" or the "40 GHz band".

A challenging task of an optical networking system is infrastructure planning. Typically, system engineers need to know the maximum capacity (number of channels) of the transmission system and be able to implement the system with available technology. As the system demand grows, it is generally desirable to be able to expand capacity without disrupting existing traffic flow, much like the challenge of widening a busy highway. A particular challenge arises from the need to periodically amplify optical signals to compensate for signal losses as the signal propagates down an optical fiber.

In many optical transmission systems, provisions are made to amplify the signal (channels) at regular intervals. For example, amplification might be provided every 100 km along a long haul optical fiber path to account for signal loss (attenuation) as the optical signal propagates along the optical fiber. Many approaches have been developed to amplify the optical signals in an optical transmission system.

One early approach periodically converted the optical signal to an electronic signal, amplified the electronic signal, and re-generated the optical signal. This approach was cumbersome and required a relatively large number of components, making it prone to failure. It also typically required compromises in the amount of information (bandwidth) that could be amplified through a given path because the upper frequency limit of an electronic amplifier is generally much less than the available frequency bandwidth carried on an optical fiber.

Further approaches utilized light amplifiers to directly amplify the optical signal. There are many types of light amplifiers adaptable for use with optical communication networks; however, a common type is the doped fiber light amplifier. In a doped fiber light amplifier, an element(s), such as erbium (Eb) is added to the composition of the glass that the fiber is made from. The dopant generally provides energy levels, or states, that can be occupied by photons in the glass fiber. The doped fiber is "pumped" with an external light source, such as a pump laser diode, and this pump light is used to amplify the optical signal.

Erbium-doped fiber amplifiers ("EDFA's") provide a gain bandwidth suitable for simultaneously amplifying a number of optical channels, and one approach to amplifying the light signal is to amplify all the channels at once in a single broad-band EDFA. This is desirable because it requires only a single amplifier and associated pump circuitry, but has disadvantages, too. First, the gain provided by an EDFA is not uniform for all frequencies (channels). This can result in unequal amplification of the channels, known as gain tilt. In a transmission system where amplification is repeated several times between the source and eventual receiver, the difference in signal level between channels can build to unacceptable levels, since the gain difference generally repeats at each amplifier stage. Second, the gain provided to any one channel is typically somewhat dependant on the total signal the EDFA is amplifying. In other words, the total power needed by the amplifier increases with increasing channel count. For example, at a given pump power, if an EDFA initially amplifies four channels, and the signal traffic on the transmission fiber is expanded to eight channels, the gain of the four original channels will generally be higher than the gain of those channels when the amplifier carries the additional signal traffic. While the light amplifier can some-times be pumped for higher gain to accommodate the increased number of channels, higher pumping often injects more noise, such as amplified spontaneous emissions ("ASE"), as well as requiring more power to the pump source, often accelerating failure.

One approach to avoid some of the problems associated with broadband amplification of the entire transmission spectrum has been to de-multiplex the transmission spectrum into a number of segments, and to route each segment through an amplifier path. After the segment of the transmission spectrum has been amplified, the optical signals are sent to a multiplexer and coupled onto the output transmission fiber. Such systems allow the use of amplifiers optimized for performance over a portion of the band, each amplifier operating more or less independently from the others. However, providing several amplifiers to cover the transmission spectrum increases the component count, and typically increases the volume required for the amplifiers and associated circuitry.

Accordingly, it is desirable to provide a compact optical amplifier for use in WDM optical transmission systems and other applications. It is further desirable that any such amplifier make efficient use of the pumping energy to reduce the power requirement and necessary volume of associated pump circuitry, and to do so with low added noise.

SUMMARY OF THE INVENTION

The present invention provides an integrated modular optical amplifier for use in optical communication systems and similar applications. Wavelength selective filters are integrated with an amplifier to provide a component for use in optical amplifier arrays. In a particular embodiment, a wavelength selective input filter transmits a selected portion of an input light signal to an amplifier stage of the integrated modular amplifier and reflects a remaining portion of the input light signal to an express fiber. The selected portion is amplified and optically coupled to a wavelength selective output filter that transmits the amplified signal to an output fiber and reflects a common optical signal arriving on a common fiber to the output fiber. In a further embodiment, amplification is provided in two stages, with a center tap between the stages allowing access to the selected light signal for signal modification, such as level adjustment or dispersion compensation, before amplification by the second stage. In yet a further embodiment, a single pump light source is coupled to both amplification stages, with a pump interconnect fiber, for example.

In a specific embodiment, the integrated modular amplifier is provided as an essentially cylindrical component that is compact and robust. Use of ferrules containing fiber ends, in conjunction with collimators and other optical elements, reduces the number of required fusion splices required to implement the integrated modular amplifier.

DETAILED DESCRIPTION OF THE INVENTION

I. Introduction

The present invention provides an optical amplifier in combination with a wavelength selective filter for amplifying a segment of an input transmission spectrum. The segment can be a channel defined on an optical communication network or a number of adjacent channels, for example. In a specific embodiment, amplification is achieved in two stages with a single light pump using doped fiber amplifier sections. A center tap is provided between the two amplifier stages, allowing further signal manipulation, such as dispersion compensation, leveling, and signal filtering, for example. The amplifier assembly is fabricated using ferrules and collimators to reduce the number of fused splices between fiber sections, thus achieving low insertion loss without numerous fusion splices. The ferrule-collimator subassemblies, hereinafter referred to as "flashlights" are generally cylindrical in configuration, allowing additional optical components, such as filters and isolators, to be assembled in a generally co-linear fashion in a cylindrical housing. The filters are preferably thin-film dielectric stack filters, for example. In a particular embodiment, each flashlight has a diameter of about 3.5 mm and a length of about 30 mm.

II. An Integrated Modular Amplifier

Figure 1A:
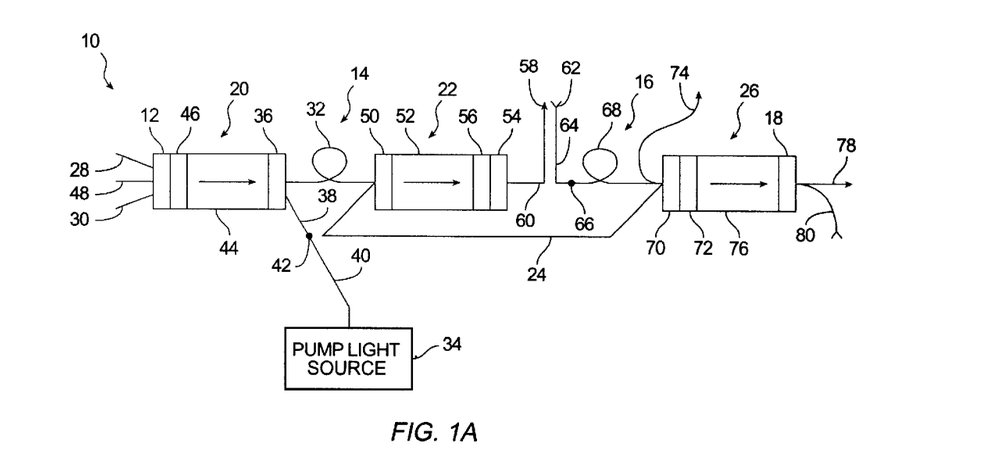
FIG. 1A is a simplified diagram of an integrated modular amplifier according to an embodiment of the present invention.
Figure 2A:
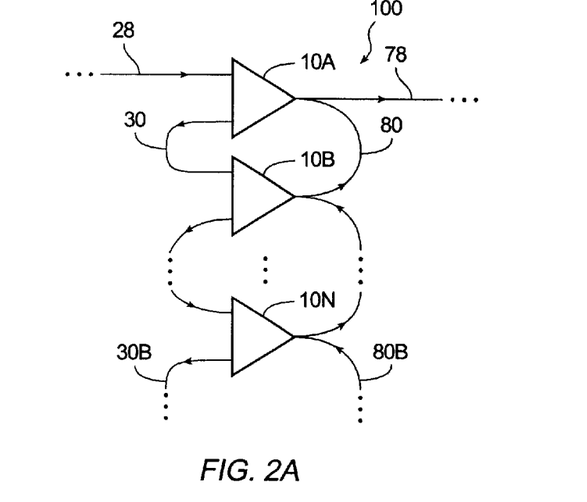
FIG. 2A is a simplified diagram of integrated modular amplifiers according to the present invention arranged in an amplifier array.
Figure 2B:
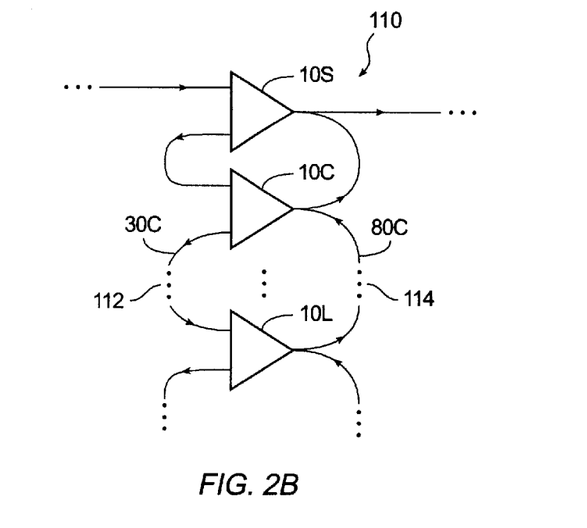
FIG. 2B is a simplified diagram of broad-band integrated modular amplifiers according to the present invention arranged in an amplifier array.

FIG. 1A is a simplified schematic of an integrated modular amplifier 10 and associated light pump according to an embodiment of the present invention. The term "integrated modular amplifier" relates to the combination of a wavelength selective input filter 12 optically coupled in series with an amplifier stage(s) 14, 16 and a wavelength selective output filter 18. The integrated modular amplifier is designed to operate over a selected subsection of the transmission system spectrum (occupied and/or planned). The wavelength selective filters in combination with the amplifier allow amplifier performance to be optimized for the selected subsection of the spectrum. The integrated modular amplifier can be used in an amplifier array, such as shown in FIGS. 2A and 2B, for example. The modular integrated amplifier generally includes a hybrid input component 20, a first amplifier stage 14, a hybrid center stage component 22, a second amplifier stage 16 optically coupled to the first amplifier stage with a pump interconnect fiber 24 and a hybrid output component 26.

The wavelength selective input filter is configured to transmit a selected segment of the light spectrum, if any, carried on an input fiber 28 and to reflect the remainder of the light spectrum to an express fiber 30. The input fiber and express fiber are typically single mode fibers, and typically have similar characteristics, such as material and core diameter. Wavelength selective filters such as 12 and 18 are also known as narrow bandwidth filters, A/D (ADD/DROP) filters, and WDM (wavelength division multiplex) filters, and can be a stack of alternating thin-film layers of dielectric materials, for example, as is known in the art. The selected light signals transmitted by the wavelength selective input filter are coupled to a first amplifier stage 14, which includes a first segment of erbium-doped optical fiber 32, commonly referred to as an "EDF".

The first EDF is pumped by a pump light source 34 that is typically a laser diode providing light with a shorter wavelength than the input signal. Light from the pump light source is directed to the EDF 32 and away from the input fiber 28 and express fiber 30 by a pump filter 36. It is understood that other dopants could be used in addition or alternatively to erbium, and that the term "EDF" is used hereafter for ease of description. The pump light source 34 is connected to the integrated modular amplifier with a pump fiber 38 that is mechanically and optically coupled to a pump output fiber 40 with a fusion splice 42.

An isolator 44 is provided to suppress amplified spontaneous emissions ("ASE") or other unwanted light within the segment of the spectrum transmitted by the wavelength selective input filter 12, thus avoiding injecting noise onto the express or input signals. A partial reflection filter (mirror) 46 reflects a small amount of the light signal back into an input tap fiber 48, which is then used in a feedback loop to control the pump power, in conjunction with other parameters.

Figure 3A:
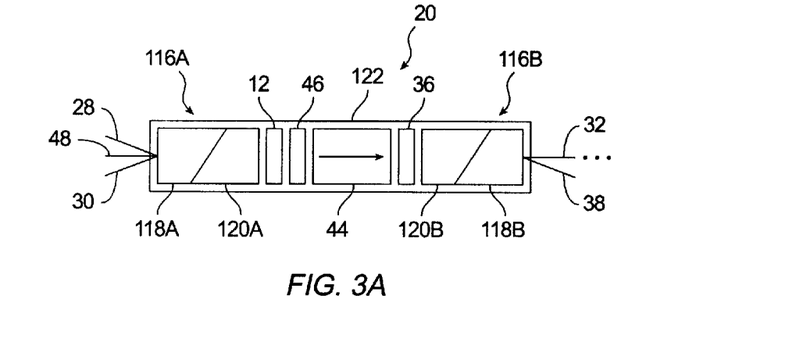
FIG. 3A is a simplified diagram of a hybrid input component according to an embodiment of the present invention.

The first EDF 32 and the pump fiber 38 are optically coupled and held by a dual hybrid fiber ferrule (see FIG. 3A ref. num. 118B). A hybrid fiber ferrule contains different types of optic fiber, in this instance, the pump fiber 38 and the EDF 32, rather than similar fibers, such as the triple ferrule (FIG. 3A, 118A) containing the input, input tap, and express fibers. Having the three-fiber ferrule reduces the number of components inside the module or packaged amplifier, and reduces the number of fusion splices, thus improving reliability. Using fibers with different characteristics (such as core diameter) may cause an additional insertion loss, but the hybrid ferrule is often desirable in spite of this for its size and reliability. Focusing of the fiber ends with respect to the collimator may be adjusted according to desired performance and system characteristics. For example, the dual hybrid ferrule 116B could be aligned with the collimator 120B to reduce insertion loss of the input signal while slightly increasing the insertion loss of the pump signal. This may be acceptable if sufficient pump power is available, or if the amplifier is sufficiently efficient. It is noted that optimizing the amplifier to operate over a narrow band allows one to increase amplifier efficiency.

The hybrid center stage component 22 includes a second pump filter 50 and another isolator 52, as well as a gain flattening filter 54 and a narrow band (pass band) filter 56. The isolator is provided to keep undesired light from entering the first amplifier stage via the center tap output port 58. It is understood that the physical configuration is exemplary only, and that other configurations may be used, and that some of the optical elements in this or the other hybrid components may be optional in some instances. For example, the narrow band filter 56 may provide desirable out-of-band rejection when used in conjunction with the wavelength selective input filter 12, which may be optimized for low insertion loss and passband flatness, for example. In some optical transmission systems, or with some input filters, the narrow band filter may not be necessary. In an alternative embodiment, a narrow band filter and a gain-flattening filter may be implemented as a single structure (i.e. a continuous dielectric layer stack), and need not be two physically separate optical elements.

Similarly, the gain flattening filter 54 typically has a transmission characteristic that is basically inverted to the gain characteristic of the first amplifier stage (or first and second amplifier stages in combination). That is, an amplifier typically does not amplify all wavelengths equally, and some portions of the band transmitted by the input filter may come out of the amplifier relatively stronger than they went in. The gain flattening filter can provide higher transmission loss in the spectrum where the amplifier gain is higher, thus maintaining a more constant amplitude characteristic across the segment of the transmission spectrum passed by the modular integrated amplifier. In some instances, the relative signal strengths may be sufficiently similar without such a filter, or the gain characteristics of the amplifier sufficiently flat (with respect to wavelength) to omit the gain flattening filter. Another advantage of embodiments of the present invention is the ability to design a superior gain equilization filter because the filter only has to operate over a relatively narrow band.

The output of the hybrid center stage component 22 is provided to the center tap output 58 of a center tap output fiber 60. A center tap input 62 is also provided with the modular integrated amplifier. A center tap input fiber 64 is fusion spliced 66 to the second EDF 68 of the second amplifier stage 16. The center output and input taps provide access to the optical signals passing though the modular integrated amplifier. The center tap can provide an ADD/DROP function for those wavelengths passing through the device, dispersion compensation, signal leveling, and/or further signal filtering, for example. In one embodiment, the center tap output and input are connected together (shunted) without further modification of the light signal. It is generally desirable to minimize the number of fusion splices because they are labor intensive. It is further generally desirable to minimize fusion splicing different types of fibers together because such splices are considered to be a reliability issue. Note that the entire light path of the signal passed by the integrated modular amplifier to this point does not contain a fusion splice, and in particular, that the first stage of amplification is achieved without a fusion splice of the first EDF 32.

The second EDF 68 is coupled to the pump interconnect fiber 24 in the hybrid output component 26. A third pump filter 70 reflects the pump light carried from the pump light source 34 via the first EDF 32 and pump interconnect fiber 24 into the second EDF 68, and keeps pump light from being transmitted to the output of the integrated modular amplifier. Thus, a single pump is utilized to pump both stages, thus reducing component count and providing a compact size for the pump-amplifier combination. Additionally, the pump light is efficiently utilized, as one amplifier stage can use the pump power not consumed by the other (a so-called pump-recycled optical fiber amplifier, or "PROFA"). Finally, the total fiber length (of the first and second EDFs) can be optimized, including the ratio of lengths, according to the desired amplifier performance and available pump power. However, it is not necessary that the optical fibers used for the first and second amplifier stages be the same material, and in some embodiments, are intentionally different. For example, the first stage may be configured for low noise, while the second stage is configured for enhanced gain characteristics.

A second partial reflection filter 72 reflects a portion of the light signal from the second EDF (as well as in-band pump light and noise) to an output tap fiber 74. The output tap fiber can be used to monitor the light from the second EDF to adjust the pump power via a feedback loop, for example, typically in conjunction with the signal from the input tap fiber 48. An isolator 76 suppresses undesired light from entering the second amplifier stage via the output fiber 78. A wavelength selective output filter 18 transmits the segment of the spectrum passed by the integrated modular amplifier to the output fiber 78 and reflects light arriving on the common fiber 80 (e.g. from other modular amplifiers or optical paths or sources) to the output fiber 78. Thus, the wavelength selective output filter combines the transmitted and reflected light signals onto the output fiber.

Figure 1B:
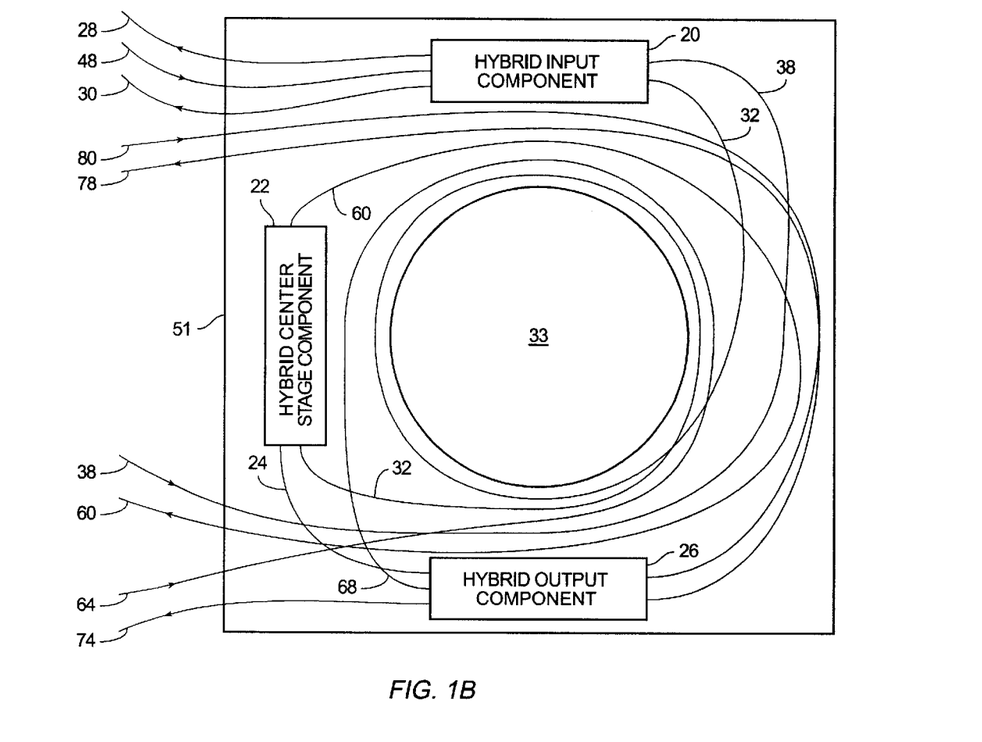
FIG. 1B is a simplified top view of a packaged integrated modular amplifier assembly with the top removed for illustration.

FIG. 1B is a simplified top view of a packaged integrated modular amplifier assembly 10 with the top removed for illustrative purposes. The hybrid input component 20, hybrid center stage component 22, and hybrid output component 26 are arranged in a generally horse-shoe fashion. The first EDF 32 and second EDF 68 are wound around an interior spool 33. The amplifier assembly includes nine optical fiber "pigtails"—the input fiber 28, the input tap fiber 48, the express fiber 30, the pump fiber 38, the center tap output fiber 60, the center tap input fiber 64, the output tap fiber 74, the output fiber 78, and the common fiber 80. The integrated modular amplifier is contained in a package approximately 65 mm×65 mm×6.5 mm. The package is not drawn to scale, and the routing of the optical fibers is simplified for purposes of illustration, as it is generally desirable to avoid sharp bends in the fiber.

III. Amplifier Arrays Utilizing Integrated Modular Amplifiers

FIG. 2A is a simplified block diagram of an amplifier array 100 according to an embodiment of the present invention illustrating the operation of the amplifier in combination with the wavelength selective filters. An input fiber 28 carries input light signals to a first integrated modular amplifier 10A. A first segment of the input light signal is passed through the first integrated modular amplifier to the output fiber 78. A remainder of the input light signal is reflected to a second integrated modular amplifier 10B via a first express fiber 30. The second integrated modular amplifier passes a second segment of the input light signal, and so forth for additional segments and integrated modular amplifiers, indicated by the Nth integrated modulator 10N.

The output of the second integrated modular amplifier, along with any signals reflected off the second wavelength selective output filter, is coupled to the output of the first integrated modular amplifier via the common fiber 80 of the first integrated modular amplifier (which is also the second integrated modular amplifier output fiber), where it is reflected onto the output fiber 78 of the array by the wavelength selective output filter of the first integrated modular amplifier. The "final" express fiber 30B and the "final" common fiber 80B can be left open to allow for further expansion of the amplifier array without disrupting existing signal traffic flowing through one of the existing integrated modular amplifiers.

In a preferred embodiment, each segment of the input spectrum passed through a single integrated modular amplifier includes four adjacent channels of a dense wavelength division multiplexed ("DWDM") system. Of course, more or fewer channels could be passed through any given path, and different paths might have different bandwidths. For example, in areas where the gain of the EDF is more consistent with respect to frequency it might be desirable to increase the bandwidth to minimize the number of required amplifier paths and associated circuitry.

FIG. 2B is a simplified diagram of an amplifier array 110 utilizing integrated modular amplifiers according to another embodiment of the present invention. This array is similar to the array shown in FIG. 2A except that relatively broad-band integrated modular amplifiers are used. For example, the first integrated modular amplifier 10S might pass S-Band (145–1530 nm) and the second integrated modular amplifier 10C might pass C-Band (1530–1560 nm). The final express fiber 30C and the final common fiber 80C allow for the addition of future bands, such as L-Band (1565–1620 nm), represented by a third integrated modular amplifier 10L, the dotted lines 112, 114 representing future optical connections.

IV. Further Details of Sub-Assemblies

FIG. 3A is a simplified diagram of a hybrid input component 20 for use with an integrated modular amplifier according to an embodiment of the present invention. An input flashlight 116A includes a triple ferrule 118A and a collimator 120A, such as a graded-index ("GRIN") lens. The ferrule has a capillary (not shown) that holds the three fibers in place in relation to the collimator. The ferrule and fibers are typically angle lapped with respect to the collimator, as is known in the art and represented by the diagonal line separating these components. The three fibers of the first flashlight include the input fiber 28, the express fiber 30, and the input tap fiber 48, as discussed above in conjunction with FIG. 1. The collimator converts the essentially point source of light from the fiber ends into an essentially parallel light "beam". The ferrule and collimator are typically cemented in place after aligning the flashlight assembly.

The collimator 120A focuses light onto the wavelength selective input filter 12, which transmits a selected segment of the input spectrum, and reflects the remainder to the express fiber 30. The partial reflection filter 46 reflects a portion of the selected input signal segment to the input tap fiber for use as a feedback signal in a pump control circuit (not shown). The respective filters and fibers are optically aligned to achieve the desired result, as is known in the art. The selected input signal segment is then passed through an isolator 44, which can be a lithium-niobate Faraday rotator, for example, then to the pump filter 36, and then to a second flashlight 116B. The second flashlight 116B includes another collimator 120B and a dual hybrid fiber ferrule 118B that holds an end of the first EDF 32 and the pump fiber 38. The ferrule is a hybrid fiber ferrule because is contains two different types of fiber, in this case fibers having similar outer diameters, but being of different materials and having different core diameters. The flashlights 116A, 116B, filters 12, 46, 36 and isolator 44 are all assembled within a cylindrical housing 122, or tube. The cylindrical housing provides a compact and robust assembly. Furthermore, optical coupling to the fibers, particularly the EDF, is accomplished without fusion splicing, thus avoiding the need to use a splice guard to protect the fusion splice, making the assembled component more reliable and compact.

Figure 3B:
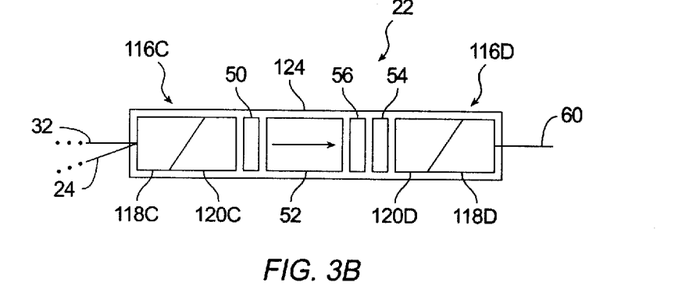
FIG. 3B is a simplified diagram of a hybrid center stage component according to an embodiment of the present invention.

FIG. 3B is a simplified diagram of a hybrid center stage component 22. A third flashlight 116C includes another dual hybrid fiber ferrule 118C that holds the other end of the first EDF 32 and one end of the pump interconnect fiber 24. The collimator 120C focuses the light on the second pump filter 50, which rejects the pump light to avoid coupling to the center tap output fiber 60. An isolator 52, narrow-band filter 56, and gain flattening filter 54 are illustrated in an exemplary sequence between the third flashlight 116C and a fourth flashlight 116D in a second cylindrical housing 124. The fourth flashlight 116D includes a single-fiber ferrule 118D.

Figure 3C:
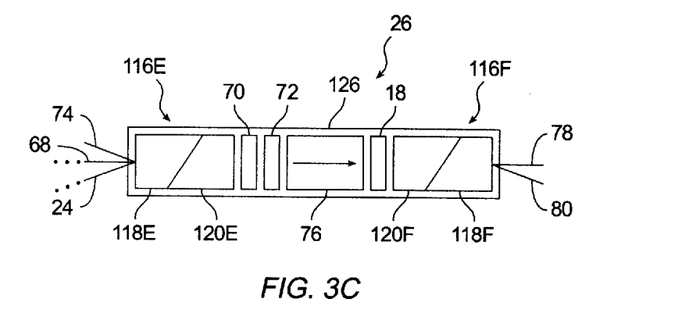
FIG. 3C is a simplified diagram of a hybrid output component according to an embodiment of the present invention.

FIG. 3C is a simplified diagram of a hybrid output component 26. A fifth flashlight 116E includes a three-fiber hybrid ferrule 118E and a collimator 120E that focuses the light from the pump interconnect fiber 24 onto the third pump filter 70, to be reflected into the second EDF 68. The light signal from the second EDF 68 passes through the third pump filter to a second partial reflection filter 72, which may be similar or different from the first partial reflection filter (see FIG. 3A, ref. num. 46), according to the intended application and selected design. The partial reflection filter reflects a portion of the incident light to the output tap fiber 74 to be used as a feedback signal in a pump control circuit, for example. An isolator 76 and wavelength selective output filter 18 are illustrated between the fifth flashlight 116E and sixth flashlight 116F, along with the other optical elements, within a third cylindrical housing 126.

V. Experimental Results

Figure 4A:
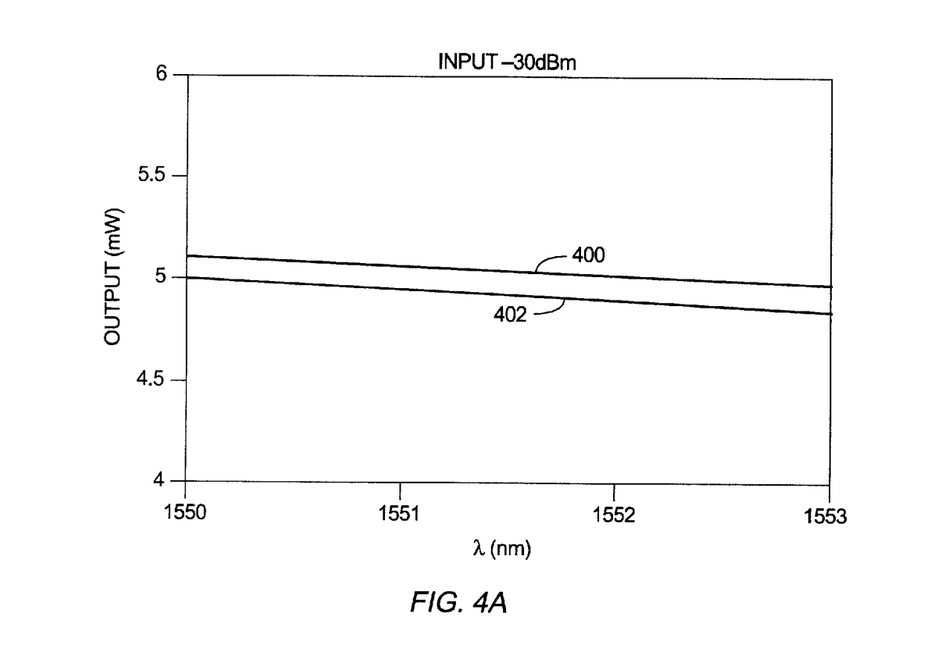
FIG. 4A is a graph comparing a broadband amplifier and a narrowband amplifier for output power versus wavelength.

FIG. 4A is a graph showing the superior performance of a two-stage narrowband amplifier with a narrow band filter (see FIG. 1A, ref. num. 56) between amplifier stages according to an embodiment of the present invention versus a similar two-stage broadband amplifier for output power. The broadband amplifier does not include a narrow band filter between the amplifier stages. The output power 400 of the narrowband amplifier was configured to amplify four contiguous channels spaced 100 GHz apart (1550–1553 nm), each channel being provided at a signal level of about −30 dBm. The broadband amplifier was configured to amplify signals from 1530–1560 nm; however, the same four-channel input signal was provided. Four data points for each amplifier were measured. The output power of the broadband amplifier is indicated by the lower curve 402. The same type of doped fiber of the same length(s) was used in each amplifier. The broadband amplifier was pumped with 140 mW of power while the narrow band amplifier needed only 100 mW of pump power to achieve the indicated output powers. Thus, the narrowband amplifier requires about 30% less pump power than the broadband amplifier. It is expected that this lower power requirement will be reflected in longer pump source lifetime and hence reliability. It is believed that the narrow band amplifier achieves the superior output power at a lower pump power because the narrow band filter in the path between the two amplifier stages filters out the ASE generated in the first amplifier stage, thus reducing the noise energy coupled to the second amplifier stage. Thus, more power is available in the second stage for amplifying the desired signal(s), rather than being used to amplify noise. Further reference is made to FIG. 4C and the associated description.

Figure 4B:
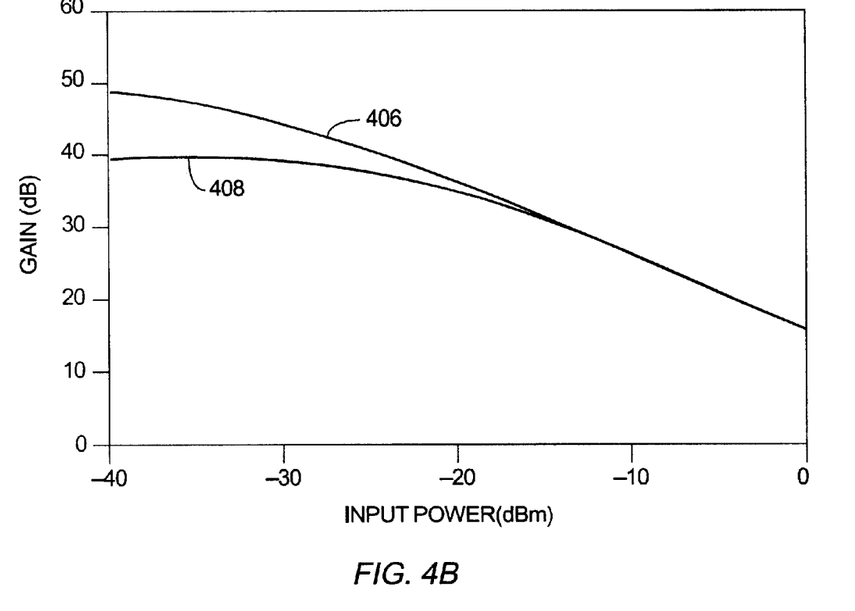
FIG. 4B is a graph comparing a broadband amplifier with a two-stage narrowband amplifier for gain versus input power.

FIG. 4B is a graph of gain for the narrowband amplifier 406 and the gain for the broadband amplifier 408 versus input power. A two-stage amplifier was used in each case. The narrow band amplifier provides superior gain performance at the lower input power levels.

Figure 4C:
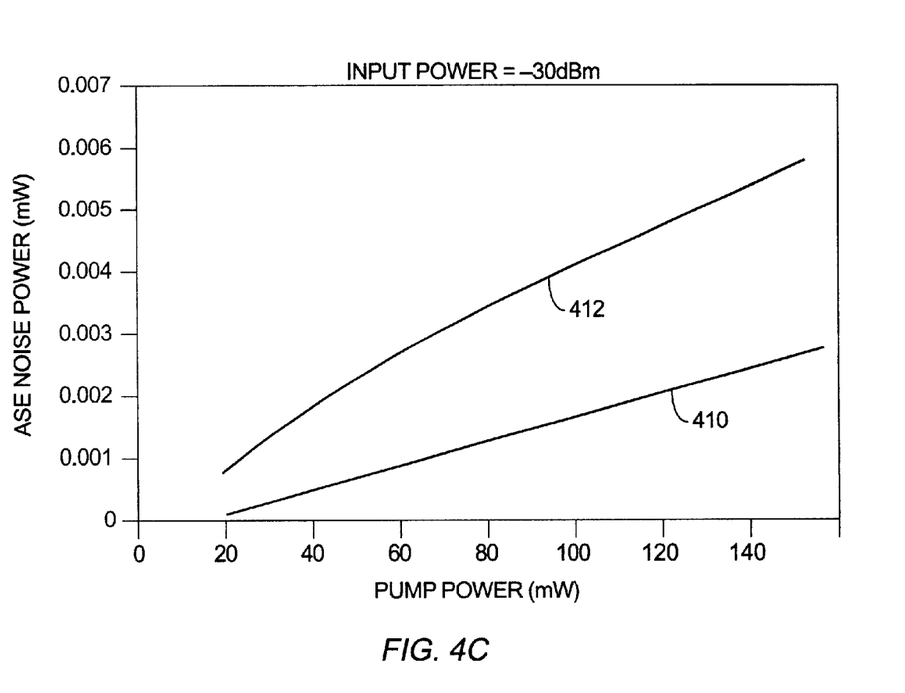
FIG. 4C is a graph comparing noise performance of a broadband amplifier and a narrowband amplifier.

FIG. 4C is a graph of amplified spontaneous emissions ("ASE") noise versus pump power for the narrowband amplifier 410 and the ASE noise for the broadband amplifier 412. As described above in conjunction with FIG. 4A, it is believed that the narrow band filter placed in the optical path between the first amplifier stage and the second amplifier stage reduces the ASE noise entering the second amplifier stage. This not only provides more available gain and output power for the desired signal(s), but also reduces the ASE noise output from the two-stage amplifier by reducing the ASE noise generated in the first stage of the amplifier that would otherwise be amplified in the second stage.

While the description above provides a full and complete disclosure of the preferred embodiments of the present invention, various modifications, alternatives, and equivalents will be obvious to those of skill in the art. For example, while embodiments of the invention have been described primarily with reference to dielectric stack WDM filters, other types of filters, such as bi-conical fused coupler filters, may be used with appropriate isolators, couplers or other devices, such as a wavelength selective coupler. Similarly, a variety of optical fibers, including amplifying optical fibers may be employed, and various sequences of optical components may be used. For example, the pump fiber could be combined with the first doped fiber in the center stage hybrid component, the pump interconnect fiber being combined with the first doped fiber in the input hybrid component. Accordingly, the scope of the invention is limited solely by the following claims.

What is claimed is:

1. An integrated optical amplifier assembly comprising:
 a wavelength selective input filter (12) configured to receive an input light signal from an input optical transmission line (28), the wavelength selective input filter transmitting a selected portion of the input light signal to
 an amplifier stage (14), and reflecting a remaining portion of the input light signal to
 an express optical transmission line (30), the amplifier stage being configured to amplify the selected portion of the input light signal to form an amplified selected portion of the input light signal and optically couple to
 a wavelength selective output filter (18), the wavelength selective output filter being configured to transmit the amplified selected portion of the input light signal to an output optical transmission line (78) and to optically couple a common light signal from a common optical transmission line (80) to the output optical transmission line.

2. The integrated optical amplifier of claim 1 wherein the wavelength selective input filter comprises a stack of dielectric layers.

3. The integrated optical amplifier of claim 1 wherein the amplifier stage includes a doped fiber segment (32) suitable for light amplification when operated in conjunction with a light pump signal from a light source and further comprising:
 a ferrule (118B) containing a first end of the doped fiber segment and
 a pump fiber (38).

4. The integrated optical amplifier of claim 3 wherein at least the ferrule and the wavelength selective input filter are contained in a cylindrical housing (122).

5. The integrated optical amplifier of claim 1 further comprising
 a second amplifier stage disposed between the amplifier stage and the wavelength selective output filter; and
 a band pass filter disposed between the amplifier stage and the second amplifier stage.

6. An integrated optical amplifier comprising:
 a first ferrule including
  an input fiber and
  an express fiber;
 a first collimator optically coupled to the input fiber, the express fiber, and to
 a wavelength selective input filter optically coupled to
 a pump filter optically coupled to
 a second collimator, the second collimator being optically coupled to
 an amplifier fiber segment in a second ferrule, the second ferrule further containing
a pump fiber, the pump fiber being of a first material and the amplifier segment being of a second material, the pump filter being disposed to optically couple a pump light signal from the pump fiber to the amplifier fiber segment, the amplifier fiber segment being configurable to optically couple to at least
a third collimator optically coupled to
a wavelength selective output filter, the wavelength selective output filter being optically coupled to transmit a selected segment of an input signal to
an output fiber and to reflect a common signal on
a common fiber to the output fiber.

7. An integrated modular optical amplifier comprising:
a hybrid input component (20), the hybrid input component including
   an input ferrule (118A) containing at least
     an input fiber
     a wavelength selective input filter (12) disposed between the input ferrule and
   a first hybrid ferrule (118B) containing
     a first end of a first doped fiber segment (32) and
     a pump fiber;
a hybrid center stage component (22) including
   a second hybrid ferrule (118C) containing
     a second end of the first doped fiber segment and
     a first end of a pump interconnect fiber (24); and
   a ferrule (118D) containing
     a center tap output fiber; and
a hybrid output component (26) including
   a third hybrid ferrule containing at least
     a first end of a second doped fiber segment (68), a second end of the second doped fiber segment being optically coupled to a center tap input, and
     a second end of the pump interconnect fiber,
   a wavelength selective output filter (18) disposed between the third hybrid ferrule and
   an output ferrule (118F), the output ferrule including at least
     an output fiber and a common fiber.

\* \* \* \* \*